(12) United States Patent
Kane et al.

(10) Patent No.: US 6,355,899 B1
(45) Date of Patent: *Mar. 12, 2002

(54) TUBE CLAMPING ASSEMBLY

(75) Inventors: James M. Kane, Twinsburg; Ronald K. Fisher, Ravenna, both of OH (US)

(73) Assignee: Swagelok Company, Willoughby, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,641

(22) Filed: Sep. 15, 1998

(51) Int. Cl.$^7$ .................................................. B23K 9/02
(52) U.S. Cl. .................... 219/60 A; 219/59.1; 219/159; 219/158; 219/60 R; 219/61; 219/161
(58) Field of Search .............................. 219/60 A, 59.1, 219/159, 158, 60 R, 61, 161

(56) References Cited

U.S. PATENT DOCUMENTS

| | | |
|---|---|---|
| 2,417,533 A | 3/1947 | Wilkison |
| 3,461,265 A | 8/1969 | Spiro |
| 3,711,920 A | 1/1973 | Simmons, Jr. |
| 3,823,298 A | 7/1974 | Rohrberg et al. |
| 4,103,139 A | 7/1978 | Zollinger |
| 4,161,640 A | 7/1979 | Bromwich et al. |
| 4,365,132 A | 12/1982 | Kazlauskas et al. |
| 4,554,429 A | 11/1985 | Kazlauskas |
| 4,857,690 A | 8/1989 | Kazlauskas |
| 4,868,367 A | 9/1989 | Benway et al. |
| 4,973,823 A | 11/1990 | Benway et al. |
| 5,048,808 A | 9/1991 | Yang |
| 5,058,935 A | 10/1991 | Eidsmore |
| 5,118,024 A | 6/1992 | McClure |
| 5,136,134 A | 8/1992 | Benway et al. |
| 5,223,686 A | 6/1993 | Benway et al. |
| 5,481,793 A | 1/1996 | McClure |

*Primary Examiner*—M. Alexandra Elve
(74) *Attorney, Agent, or Firm*—Calfee, Halter & Griswold LLP

(57) ABSTRACT

A tube clamping assembly comprising a first portion having a base and a clamping device carried on the base, and a second portion having a base and a clamping device carried on the base. The first and second portions are coupled to each other such that the portions may be adjusted relative each other. In another embodiment, the invention is a tube clamping assembly comprising a base, and a first movable clamp arm and a first stationary clamp arm coupled to the base for gripping a cylindrical workpiece therebetween. The tube clamping assembly further comprises a second movable clamp arm and a second stationary clamp arm coupled to the base for gripping a cylindrical workpiece therebetween, wherein at least one of the stationary clamp arms is removably coupled to the base. In another embodiment, the invention is a tube clamping assembly comprising a base, a first clamping device carried on the base, a second clamping device carried on the base, and locking means for limiting the outward axial movement of the first and second pair of clamping devices. In yet another embodiment, the invention is a collet for clamping a cylindrical workpiece, the collet comprising a pair of clamp parts each having a clamp surface adapted to engage opposing sides of the workpiece, each clamp surface being generally shaped as half a polygon in side view having at least six sides.

19 Claims, 8 Drawing Sheets

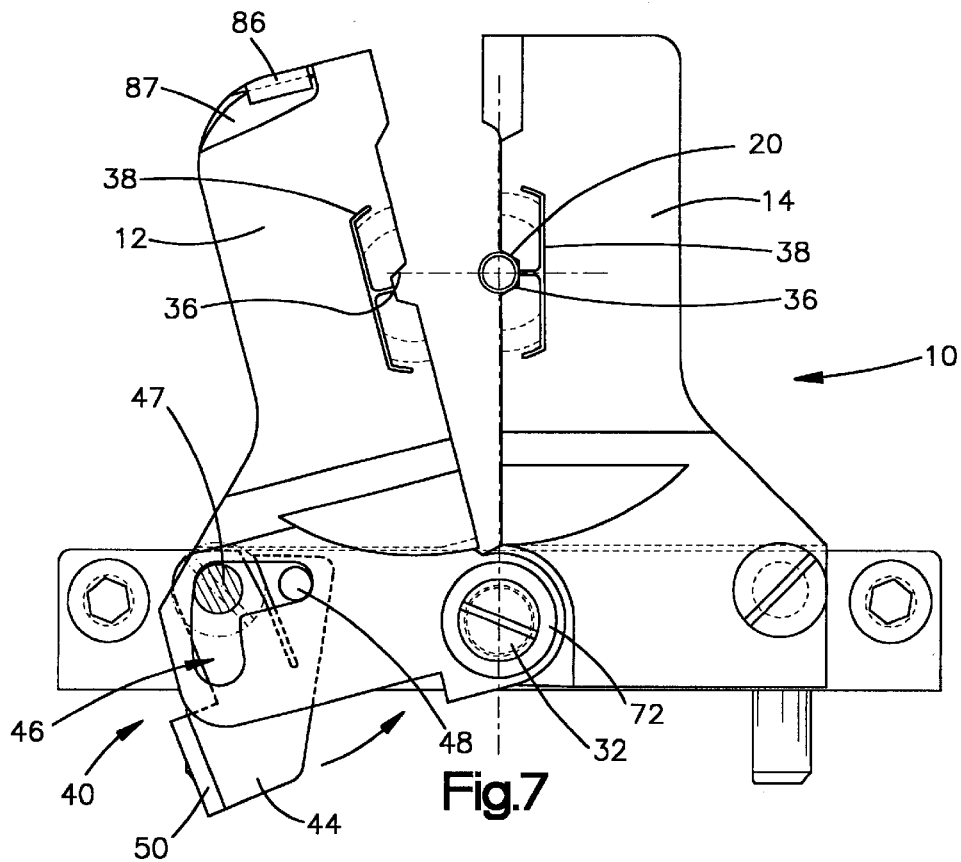
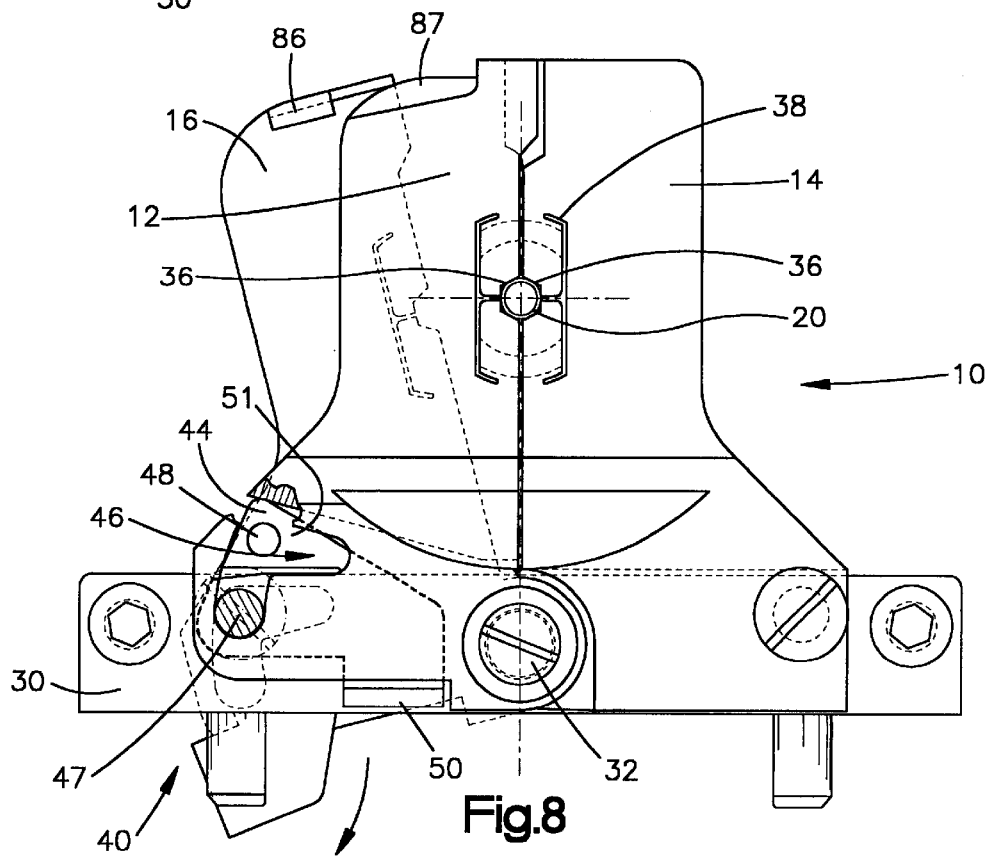

TUBE CLAMPING ASSEMBLY

The present invention is directed to methods and apparatuses for clamping cylindrical workpieces, and more particularly, to methods and apparatuses for clamping and retaining cylindrical workpieces during orbital welding operations.

BACKGROUND OF THE INVENTION

Orbital arc welding equipment is often utilized to weld tubing and piping used in fluid handling and processing systems. For example, U.S. Pat. No. 5,136,134 to Benway et al. (herein incorporated by reference), and U.S. Pat. No. 4,223,686 to Benway et al. (herein incorporated by reference) both disclose orbital welding apparatuses for welding a pair of tubular workpieces. The apparatuses disclosed therein are primarily directed to systems for welding small diameter tubing in closely confined spaces. The '134 and '686 patents disclose a tube clamping assembly for receiving and retaining the tubes to be welded during welding operations. The tube clamping assembly disclosed therein is a generally scissors-type clamp, wherein each tube is held in place between a movable clamp arm and a stationary clamp arm. A tube is mounted in each pair of arms such that they are in end-to-end abutting relation. Once the tubes have been so secured, the orbital weld head is inserted into the tube clamping assembly to carry out the welding operations, and the tubes are welded at their abutting joint. The present invention is directed to improvements in the tube clamping assembly disclosed therein and in other similar tube clamping assemblies.

When welding cylindrical workpieces, the workpieces must be radially and axially aligned such that the end of the first workpiece abuts the end of the second workpiece. However, manufacturing tolerances limit the precision of radial alignment that can be attained in most tube clamping assemblies. Accordingly, there exists a need for a tube clamping assembly capable of ensuring precise radial alignment between the tubular workpieces. An additional problem often arising with existing scissors-type tube clamping assemblies is that the fixed clamp arms, which are typically made integral with the base, are not removable. Accordingly, when the fixed clamp arms are damaged, the entire fixture may have to be replaced. Thus there is a need for a tube clamping device having removable clamp arms, particularly removable stationary clamp arms.

In order to ensure proper alignment of the tubes to be welded, axial movement of the clamp arms should be minimized. It has been found that the clamp arms may flare axially outwardly during clamping of the cylindrical workpieces. The reaction of the radial clamping forces upon the outside diameter of the tube may transfer into an axial force component which causes the clamp arms to flare outwardly. The outward movement may shift the tubes apart so that their butt ends are no longer in contact. Furthermore, it has been found that shrinkage of the weld joint during welding may cause inward movement of the clamp arms. The inward movement may cause the arms to pinch or clamp upon the weld held by the clamping assembly, which can impair the weld head rotor rotation. Accordingly, there is a need for an arrangement for limiting the axial movement of the clamp arms in both the inward and outward axial directions.

Finally, each set of clamp arms should clamp the workpiece with sufficient force such so as to securely grip the workpiece therein to avoid any shifting during welding operations. For example, U.S. Pat. No. 4,868,367 to Benway et al., hereby incorporated by reference, discloses one such apparatus for gripping and retaining a workpiece within a collet. However, existing collets may not provide sufficient contact points between the collet and the tube, thereby allowing the tube to shift with the collet. Accordingly, there is a need for a tube clamping assembly having a collet which ensures adequate points of contact between the collet and the tube.

SUMMARY OF THE INVENTION

The present invention is a tube clamping assembly which has an adjustable base to enable radial alignment of the tubes to be welded, has removable/replaceable side plates, provides an arrangement for limiting axial movement of the clamp arms, and has a collet which ensures sufficient points of contact between the collet and the workpieces. More particularly, the present invention provides for a split base having a first portion and a second portion, wherein the first portion is adjustable relative the second portion to ensure proper radial alignment of the tubes to be welded. Using the adjustable features of the present invention, precise radial alignment of the workpieces can be attained. The invention includes a tube clamping assembly comprising a first portion having a base and a clamping device carried on the base, and a second portion having a base and a clamping device carried on the base. The first and second portions are coupled to each other such that the portions may be adjusted relative each other.

The present invention also includes stationary clamp arms that may be removably attached to the base, thereby allowing them to be removed for repair or replacement. In this manner, when the component is damaged it may be repaired instead of having to replace the entire unit. In this embodiment, the invention is a tube clamping assembly comprising a base, and a first movable clamp arm and a first stationary clamp arm coupled to the base for gripping a cylindrical workpiece therebetween. The tube clamping assembly further comprises a second movable clamp arm and a second stationary clamp arm coupled to the base for gripping a cylindrical workpiece therebetween, wherein at least one of the stationary clamp arms is removably coupled to the base.

The present invention also utilizes an arrangement of overlapping and interlocking arc shields to prevent axial movement of the clamp arms in both axial directions. This inventive arrangement minimizes pinching or clamping of the weld head during welding operations, and also ensures that the workpieces remain in abutting relationship to ensure proper welds. In this embodiment, the invention is a tube clamping assembly comprising a base, a first clamping device carried on the base, a second clamping device carried on the base, and locking means for limiting the outward axial movement of the first and second pair of clamping devices.

Finally, the present invention utilizes a collet having a polygonal, preferably hexagonal, shape when in the gripping position. This collet arrangement ensures a minimum of contact points on the tube outer diameter when the tube is in its minimum, nominal, or maximum tolerance condition. These contact points significantly increase the fixture holding rigidity, and thereby minimize the chance for the tube to move after it has been clamped. In this embodiment, the invention comprises a collet for clamping a cylindrical workpiece, the collet comprising a pair of clamp parts each having a clamp surface adapted to engage opposing sides of the workpiece, each clamp surface being generally shaped as half a polygon in side view, the polygon having at least six sides.

Various other embodiments of the invention are described and claimed herein, and other features and advantages of the present device will become apparent from the following detailed description, with reference to the accompanying drawings and claims, which form a part of the specification.

BRIEF DESCRIPTION OF THE DRAWINGS

FIG. 7 is a front view of a tube and the tube clamping assembly of FIG. 1, shown in the release position;

FIG. 8 is a front view of the tube and tube clamping assembly of FIG. 7, with one of the movable clamp arms in the gripping position;

DETAILED DESCRIPTION

Figure 1:
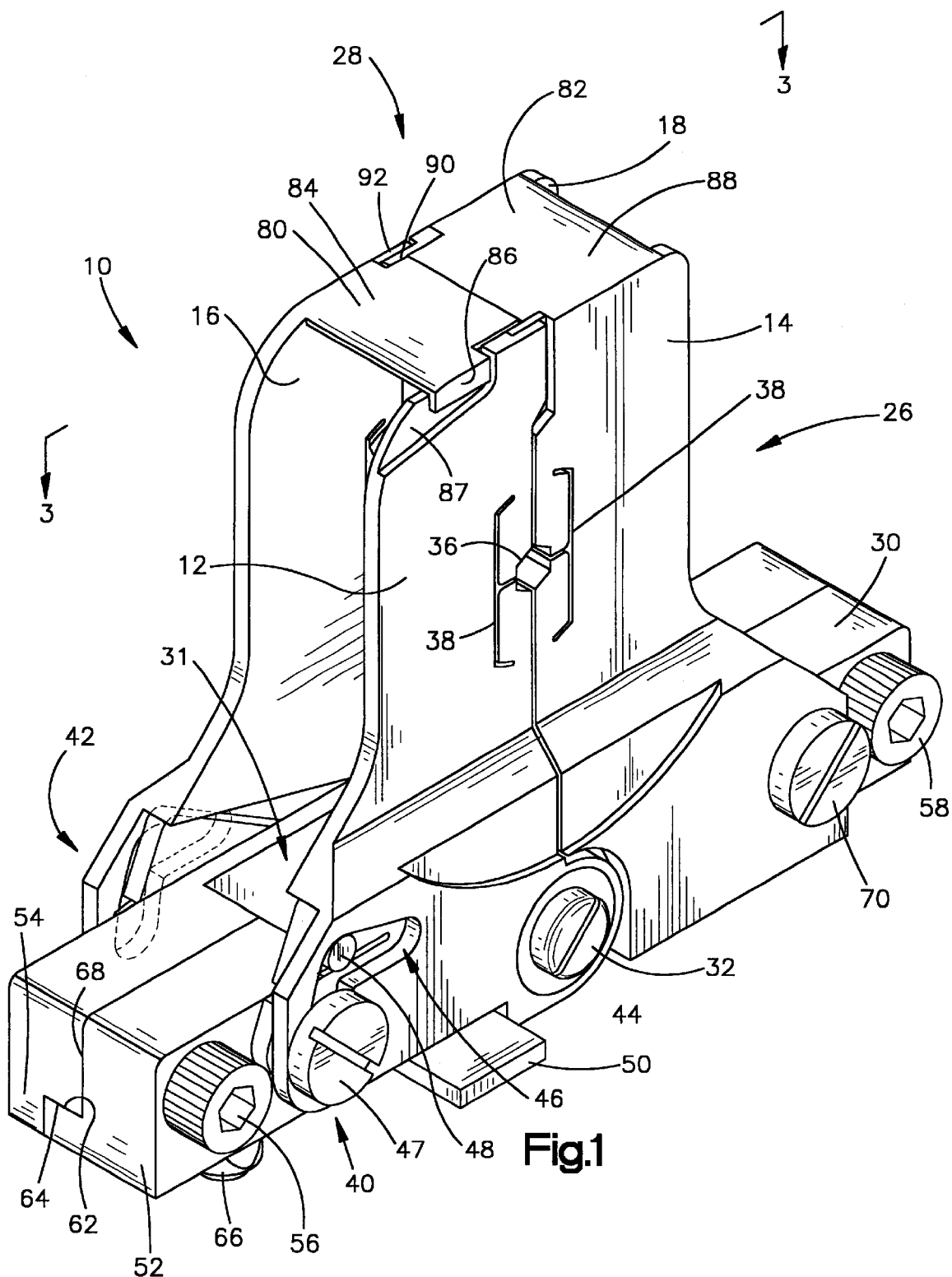
FIG. 1 is a perspective view of the tube clamping assembly of the present invention shown in the gripping position.
Figure 2:
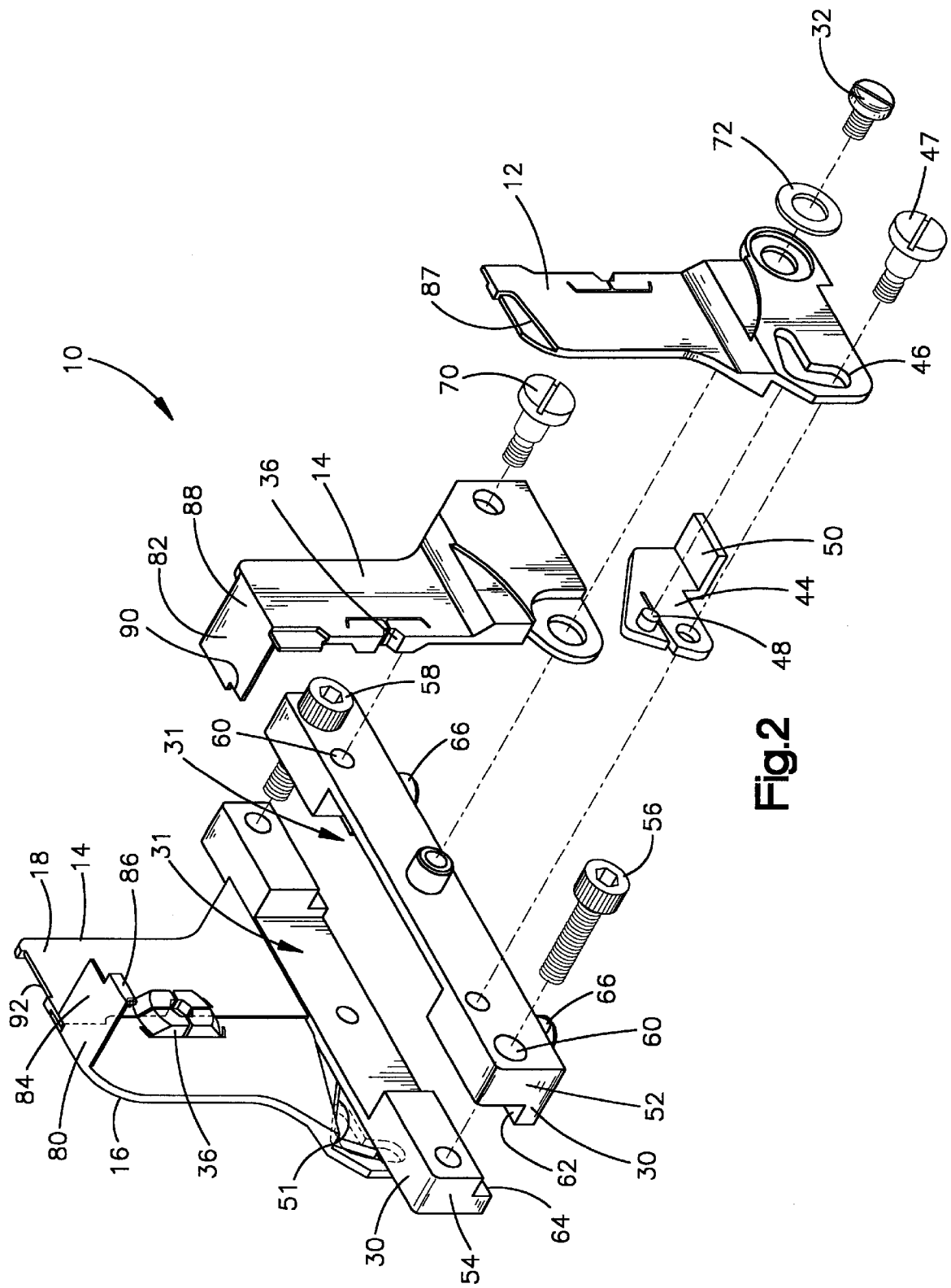
FIG. 2 is an exploded perspective view of the tube clamping assembly of FIG. 1.
Figure 3:
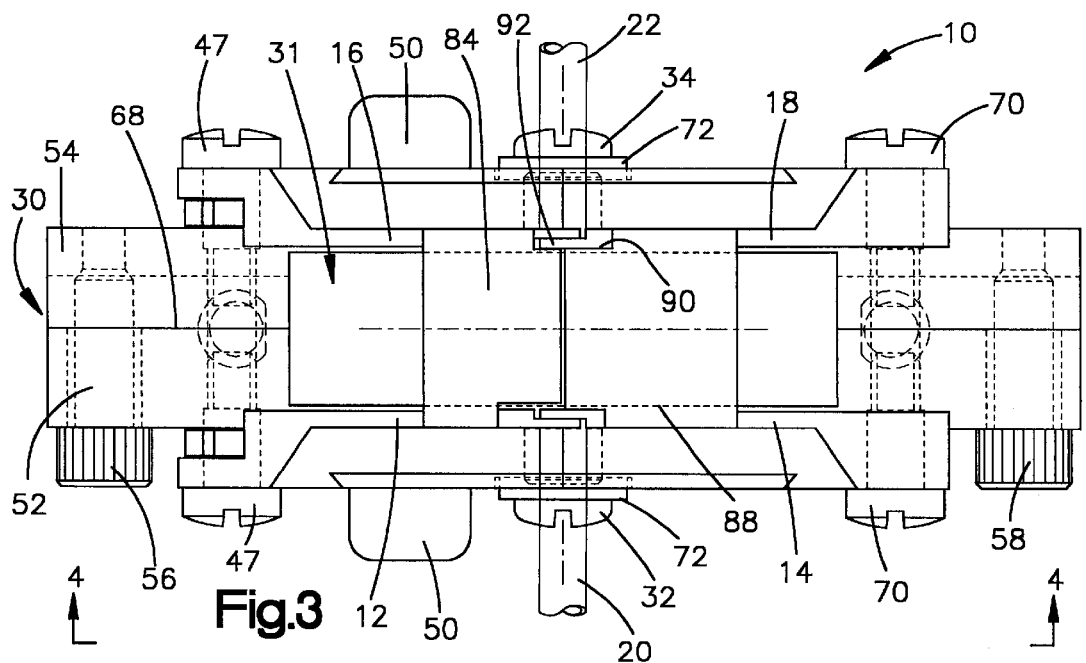
FIG. 3 is a top view of the tube clamping assembly of FIG. 1, shown with a pair of tubes mounted therein.
Figure 4:
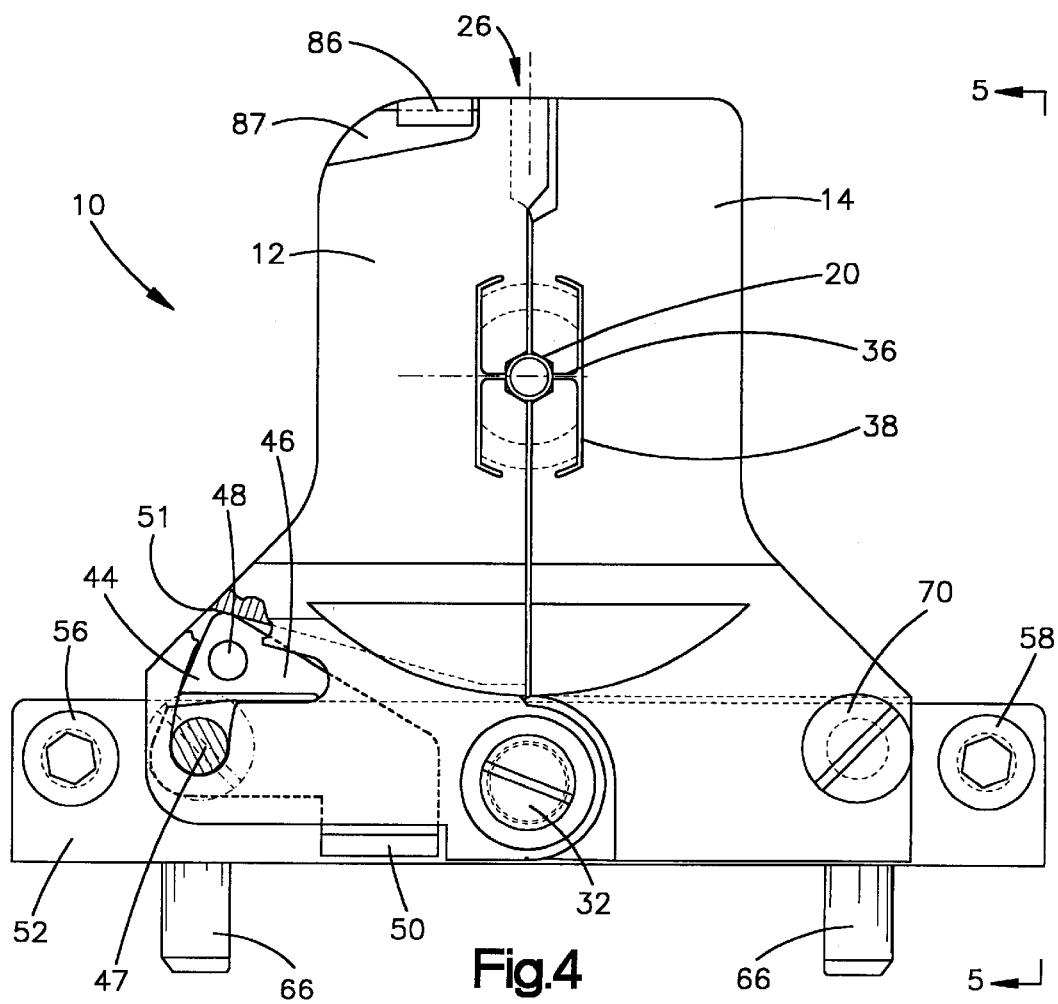
FIG. 4 is a front view of the tube clamping assembly of FIG. 1, shown with a pair of tube mounted therein.
Figure 5:
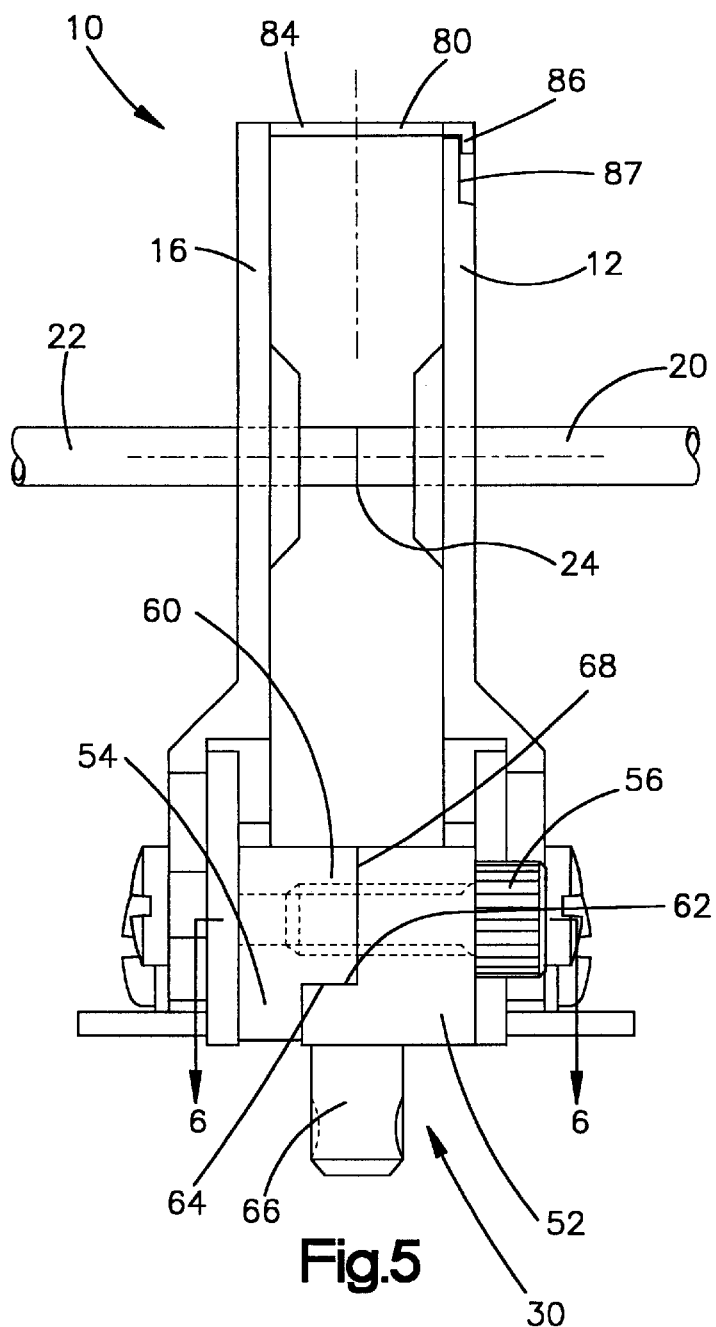
FIG. 5 is a side view of the tube clamping assembly of FIG. 1, shown with a pair of tubes mounted therein.
Figure 9:
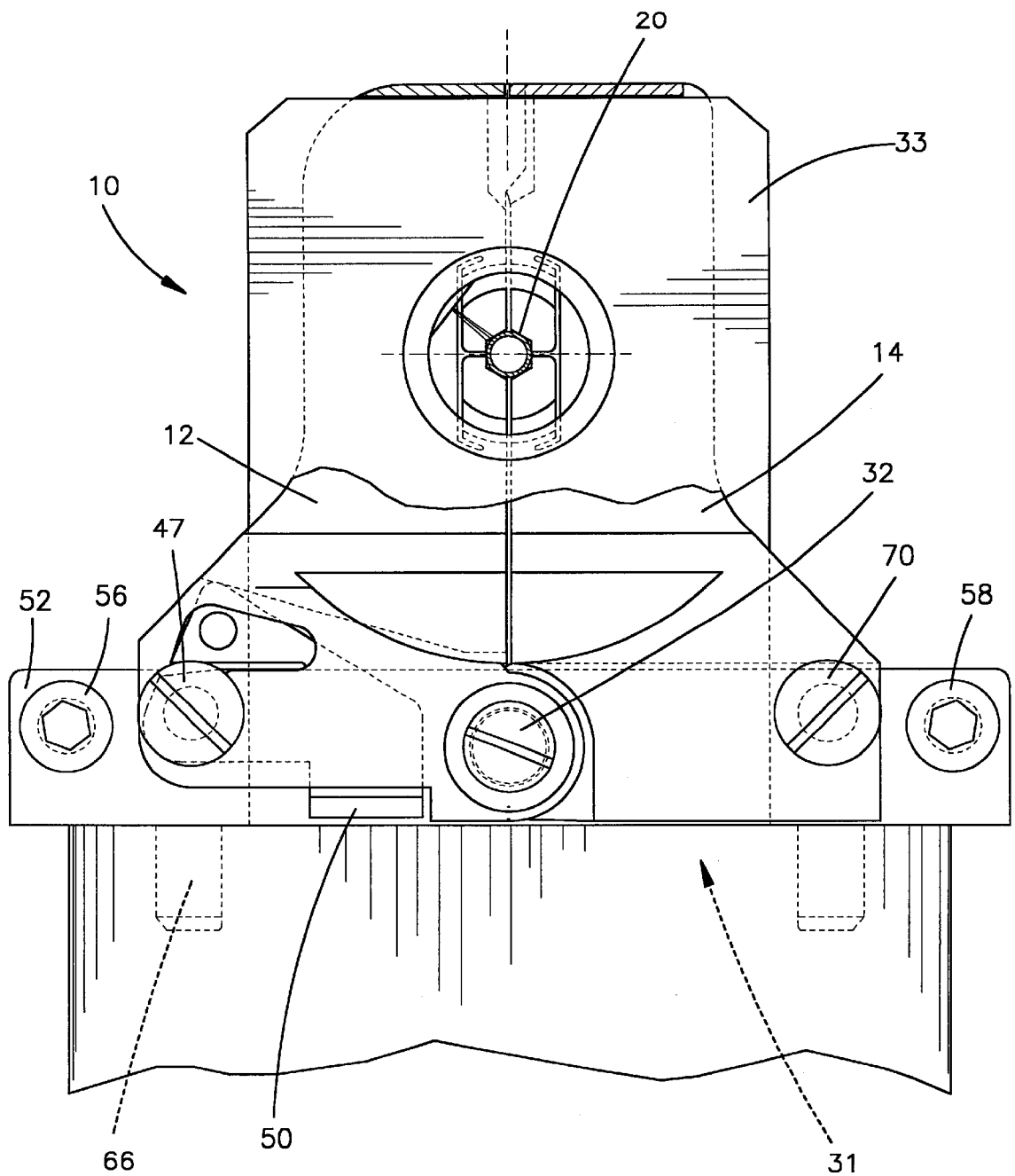
FIG. 9 is a front view of the tube clamping assembly of FIG. 1, shown with a tube and an orbital weld head.

As best shown in FIGS. 1–2, the tube clamping assembly 10 of the present invention has a set of clamp arms 12, 14, 16, 18 for clamping a pair of cylindrical workpieces, such as tubes 20, 22, therein for welding the tubes at their abutting junction 24 (FIG. 5). The weld joint is formed at the abutting point 24 of the tubes. The tube clamping assembly 10 includes a base 30 that is generally rectangular in top view, and includes an opening 31 formed therein for receiving an orbital weld head 33 (FIG. 9). The base 30 should be of solid construction to lend stability to the tube clamping assembly 10. A pair of first clamp arms 12, 14 are located on one side of the base 30, and a pair of second clamp arms 16, 18 are located on an opposite side of the base 30. The first stationary clamp arm 14 is generally rigidly fixed to the base 30, and the first movable clamp arm 12 is pivotably attached to the base such that it can rotate around pan-head screw 32. Similarly, the second stationary clamp arm 18 is generally rigidly fixed to the base 30, and the second movable clamp arm 16 is pivotably attached to the base 30 such that it can rotate around pan-head screw 34 (FIG. 3). Each pair of clamp arms together forms a releasable clamping device 26, 28. It should be understood that there exists a wide variety of clamping devices that may be used without departing from the scope of the present invention, and such clamping devices may include any apparatus that can clamp and release a cylindrical workpiece.

Each of the clamp arms 12, 14, 16, 18 has a clamping surface or clamping area 36, which in the illustrated embodiment is a cut-out formed in the clamp arms. The clamping surface 36 may be shaped as a semi-circle, semi-ellipse, half a hexagon, or other regular or irregular shapes. The first movable clamp arm 12 is pivotable to a gripping position (FIG. 8), wherein the clamping surface 36 of the first movable clamp arm 12 is aligned with the clamping surface 36 of the first stationary clamp arm 14 so as to grip a tube 20 therebetween. The first movable clamp arm 12 is also movable to a release position (FIG. 7) such that the tube 20 is not gripped by the clamping surfaces 36. It should be understood that the release position is any position in which the tube may be removed from the clamping device, and the movable clamp arm need not be moved to the position illustrated in FIG. 7 to be in the release position. All that is required is that the clamp arms release their grip to a sufficient degree so as to allow the tube to be removed or inserted, which may be accomplished by axial movement of the tube. Accordingly, the position of the first movable clamp arm 12 in FIG. 7 illustrates the fully open position, and in this state the clamp arm is also in the release position. Similarly, the second movable clamp arm 16 is movable between a gripping position and a release position. In both FIGS. 7 and 8, the movable clamp arm 16 is in the fully open position.

Each clamp arm may have machined cuts or slots 38 located adjacent the clamping surfaces 36 to provide flexibility to the clamp surfaces as they resiliently engage the periphery of the tubes. This design and the resilient nature of the clamping surface is the subject of U.S. Pat. No. 4,868,367, hereby incorporated by reference, and U.S. Pat. No. 4,973,823, hereby incorporated by reference.

Each of the movable clamp arms 12, 16 are independently actuated, or movable, by a separate actuating means 40, 42 that move the associated arm between the gripping and release positions. In the present embodiment the actuating means 40, 42 are cam actuating assemblies. The structure and operation of the first movable clamp arm 12 will be described hereinbelow, although the movement of the second movable clamp arm 16 is substantially identical. The cam actuating assembly 40 includes a cam plate 44 (FIGS. 2, 8) which is mounted for pivotal movement about shoulder screw 47. The cam plate 44 is enclosed between the base 30 and the movable clamp arm 12. The movable clamp arm 12 includes a somewhat L-shaped opening 46. A shoulder screw 47 is passed through the opening 46 and is threadedly received in the base 30. The shoulder screw 47 helps to retain the movable arm 12 on the base, and guides the pivot action of the movable arm 12. A cam pin 48 on the cam plate 44 extends outwardly through the L-shaped opening 46.

The cam plate 44 also has an outwardly extending flange 50. When it is desired to move the movable clamp arm 12 to the release position, the flange 50 is pushed downwardly, or clockwise as shown in FIG. 8, which causes the cam plate 44 to rotate around the shoulder screw 47. As the cam plate 44 rotates, the cam pin 48 engages the clamp arm 12 at the edge of the L-shaped opening 46, and thereby urging the clamp arm 12 to the release position. Further rotation of the cam plate moves the movable clamp arm 12 to the fully open position, as shown in FIG. 7. In the release position, the tube 20 to be welded may be placed between the clamp arms 12, 14, or the just-welded tubes may be removed from the clamp arms.

In order to move the movable clamp arm to the gripping position, the flange 50 and cam plate 44 are moved in the counterclockwise direction, as shown in FIG. 7, and the cam plate 44 engages a camming surface 51 in the clamp arm 12 (FIG. 8). This action urges the movable clamp arm 12 to the gripping position. When in the gripping position (FIG. 8), the clamping surfaces 36 of the clamp arms 12, 14 engage opposite sides of the tube 20 to securely hold it in place. The operation of the movable clamp arm and the cam plate and its associated components is described in detail in U.S. Pat. No. 5,136,134.

Figure 6:
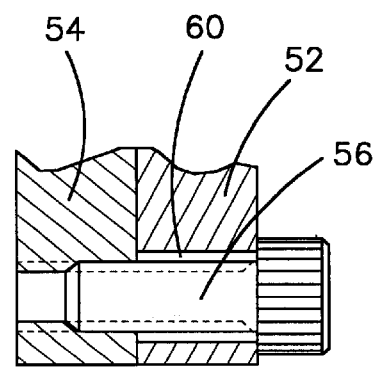
FIG. 6 is a detail cross section taken along line 6—6 of FIG. 5.

As shown best in FIG. 2, the base 30 includes a first portion 52 and a second portion 54. The first and second portion each have a cut-out 55, the cut-outs 55 being aligned so as to form a hole 31 (see FIG. 3) to closely receive an orbital weld held therein. The first and second portions are movable relative each other so as to enable adjustments to the tube clamping device. Relative adjustment in two directions (i.e. two directions in the plane of one of the clamp arms) is utilized with the present invention to enable precise radial alignment of the tubes. A pair of hex screws, 56, 58 are passed through a pair of holes 60 the first portion 52 and are threadably received in the second portion 54. As shown in FIG. 6, the holes 60 are larger than the outer diameter of the screws 56, 58 such that when the screws are loosened, the first portion 52 and second portion 54 are movable relative one another. Once the first and second portions are located in their desired relative position, the hex screws are tightened so as to couple and immobilize the first 52 and second portions 54 relative each other, illustrated in FIG. 6. Once the screws are tightened, the first and second portion 54 are pressed against each other such that frictional forces prevent relative movement.

As shown in FIG. 5, the first portion 52 has a notch 62 and the second portion 54 has a groove 64 to closely receive the notch 62. The notch and groove arrangement is included such that the split 68 between the first portion and the second portion need not be carried through the grounding posts 66. In this manner the split 68 between the first portion and the second portion is shifted laterally for ease of manufacturing and use. However, if so desired, the split 68 may be carried down the middle of the base 30, and may be desirable, for example, if grounding posts are not used.

It generally is desired to align the first 52 and second 54 portions such that a tube 20 held by the first movable clamp arm 12 and the first stationary clamp arm 14 is generally coaxially aligned with a tube 22 held by the second movable clamp arm 16 and the second stationary clamp arm 18. In order to accomplish this, a tube may be mounted within each clamping device 26, 28, and the hex screws 56, 58 loosened such that the first and second portions may be adjusted to align the tubes. However, a preferable method to achieve alignment is to first loosen the hex screws, and then pass a single tube through both sets of clamp arms. The arms are then clamped down on the tube by shifting the movable arms to the gripping position, thereby "self-aligning" the first set of arms and the second set of arms. The hex screws 56, 58 may then be tightened down to immobilize the first and second portions relative to each other, and the single tube may then be removed. Assuming that the tube is straight and true, the first set of clamp arms is now aligned with the second set of arms. This alignment may be carried out after manufacturing and before distribution of the clamp assemblies 10 of the present invention, or may also be carried out in the field should the clamp assembly subsequently require realignment.

The first stationary clamp arm 14 is generally rigidly fixed to the base 30, and the first movable clamp arm 12 is pivotably attached to the base 30 such that it can rotate around pan-head screw 32. Similarly, the second stationary clamp arm 18 is generally rigidly fixed to the base 30, and the second movable clamp arm 16 is pivotably attached to the base 30 such that it can rotate around should screw 34. Pan-head screws 32, 34 are passed through a wave washer 72 (FIGS. 2, 3) and attach the first set of arms 12, 14 and the second set of arms 16, 18, respectively, to the base. A shoulder screw 70 holds each stationary clamp arm 14, 18 attached to the base 30, and the stationary clamp arms may be removed in order to be repaired, maintained, or replaced. In order to remove the first stationary clamp arm 14, the pan-head screw 32 and the shoulder screw 70 are removed. The shoulder screw 47 coupling the first movable arm 12 to the base must also be removed. Once the screws 32, 47, 70 are removed, both the first stationary and the first movable clamp arms may be removed from the base. The same procedure may be carried out to remove the second clamp arms 16, 18. In this manner, if any of the clamp arms becomes faulty, damaged, or are otherwise in need of repair/replacement, they may be removed and/or replaced. The replacement part is attached by the shoulder screws and pan head screw in the same manner as the original part described above.

Figure 10:
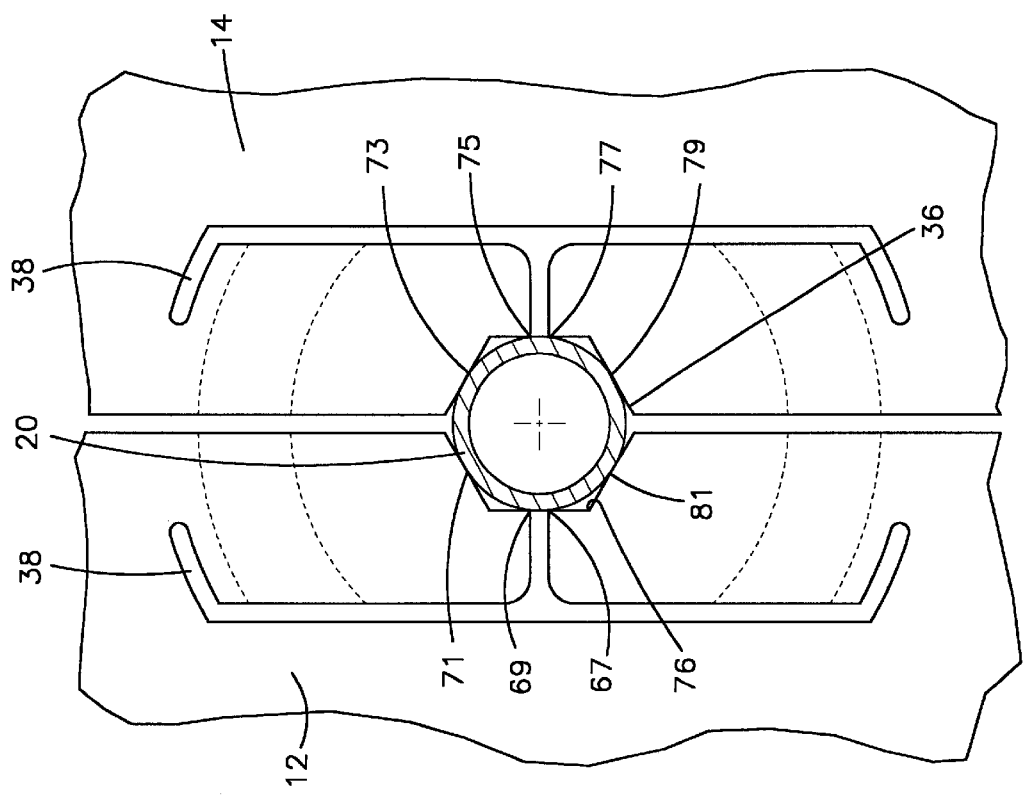
FIG. 10 is a detail front view of a tube and the tube clamping assembly of FIG. 1.

As shown in FIG. 10, the clamp areas 36 of the clamp arms, or more generally clamp parts 12, 14, 16, 18, preferably generally form a hexagon when the movable clamp arm 12, 16 is in the gripping position. Thus the clamp area 36 of each clamp arm is generally shaped as half a hexagon, and the clamp arms are preferably symmetrical. In this manner, variations in the tube 20 size can be accommodated by the clamping assembly, and several points of contact are ensured. When the tube to be gripped is relatively large, the slots 38 flex sufficiently so as to allow eight points of contact between the gripping areas 36 and the tube 20. In the present embodiment, there are eight points of contact 67, 69, 71, 73, 75, 77, 79, 81 around the periphery of the tube 20. However, the arms may be constructed such that the slots 38 are located in position other than that shown in FIG. 10. The slots may be located such that they do not intersect any of the contact points. In this case, the contact points 67, 69 are combined into a single contact point, as are the contact points 75, 77. Thus, in an alternate embodiment there are only six contact points between the tube and the generally hexagonally-shaped gripping areas 36. When there are no slots at any of the contact points, the arms should be flexible enough to allow six points of contact for the largest expected tube. That is, the workpiece to be gripped will normally have a tolerance range for its outer diameter, and the arms should be flexible enough, through the slots or other means, to accept the largest tube within the tolerance range and still provide a minimum of six points of contact.

Other shapes of the clamping areas are also possible, preferably forming other polygon shapes. For example, a triangle, square, pentagon and other polygon shapes, regular or irregular, may be generally formed by the closed clamp arms. However, in a preferred embodiment each side of the polygon forms an obtuse angle with the adjacent sides. In a further preferred embodiment, the junction between adjacent sides of the polygon 76 are curved areas to aid in the retention of inert gases about the welding joint during welding operations.

Figure 12:
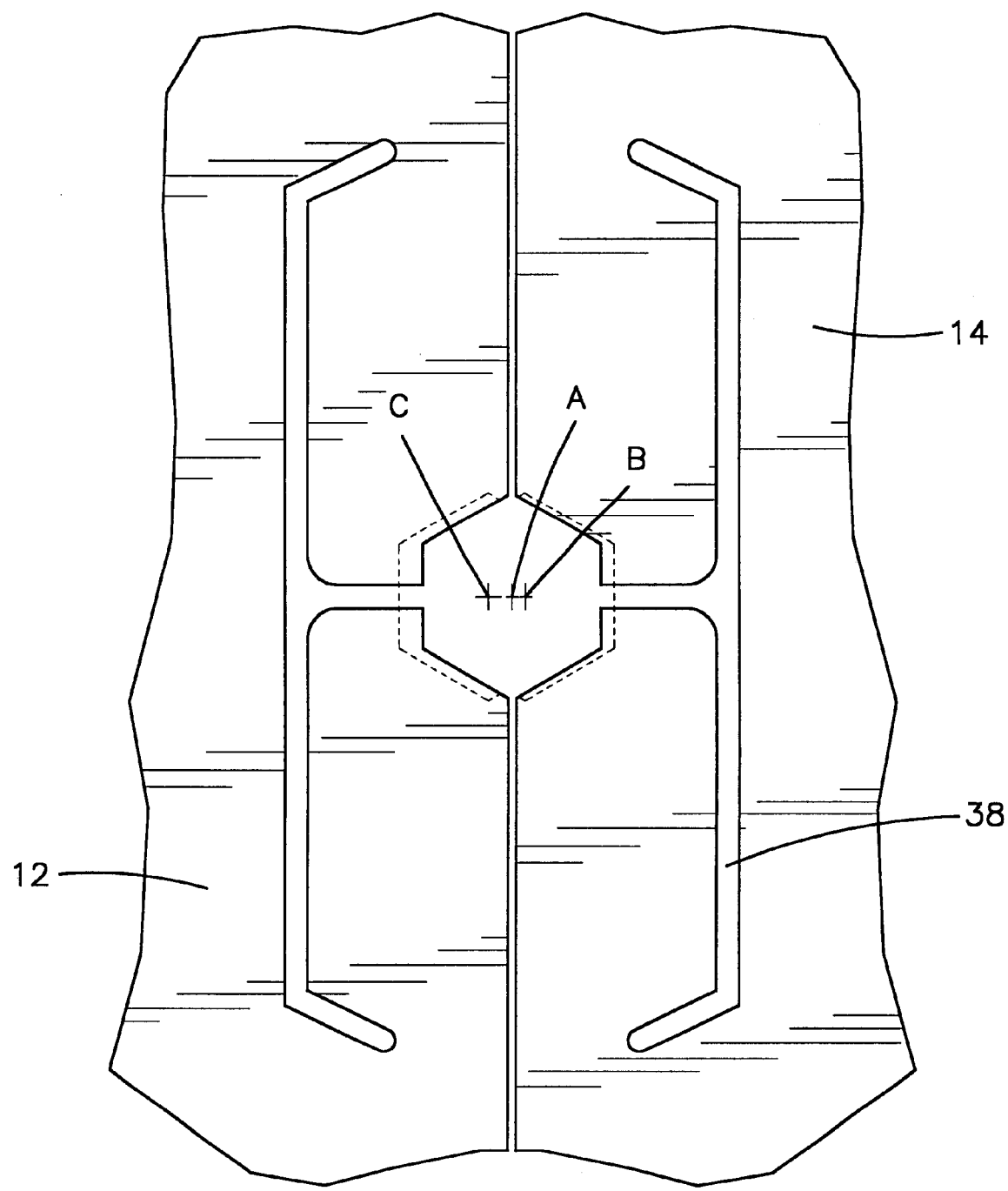
FIG. 12 is a detail front view showing the arrangement of the hexagonal tube clamping areas.

Each half of the hexagon is preferably cut at an offset from the center of the tubular workpiece to be gripped within the collet. For example, with reference to FIG. 12, the center of a cylindrical workpiece is represented at point A. The center of the half hexagon of the clamping area of clamp arm 12 is shown as point B, and the center of the half hexagon of the clamping area of the clamp arm 14 is shown as point C. The remaining outline of each hexagon for each clamping area is shown in phantom. In the illustrated embodiment, the center of each hexagon is offset in a direction away from the respective clamp arm with respect to the center of the workpiece A. The dimensions illustrated in FIG. 12 are greatly exaggerated for ease of illustration, and the centers of each hexagon are offset an appropriate dimension for the required use, such as 0.01 inches in one embodiment. The offset of the center of the each hexagon enables the clamp arms to grip a tube that has a relatively small diameter. When moved to the gripping position, the hexagons of each clamp arm may "overlap" as shown in FIG. 12 to grip a tube having an outer diameter at the lower end of the tolerance range, and at least six points of contact are guaranteed.

Further preferably, the length of each side of the hexagon has a length equal to the diameter of the largest tube anticipated to be used with the clamping assembly; that is, the largest tube diameter in the tolerance range for the workpieces. As discussed earlier, clamping areas shaped as generally regular polygons may be used. In that case, the length of a side of the polygon is preferably about equal to the diameter of the largest tube in the tolerance range.

Figure 11:
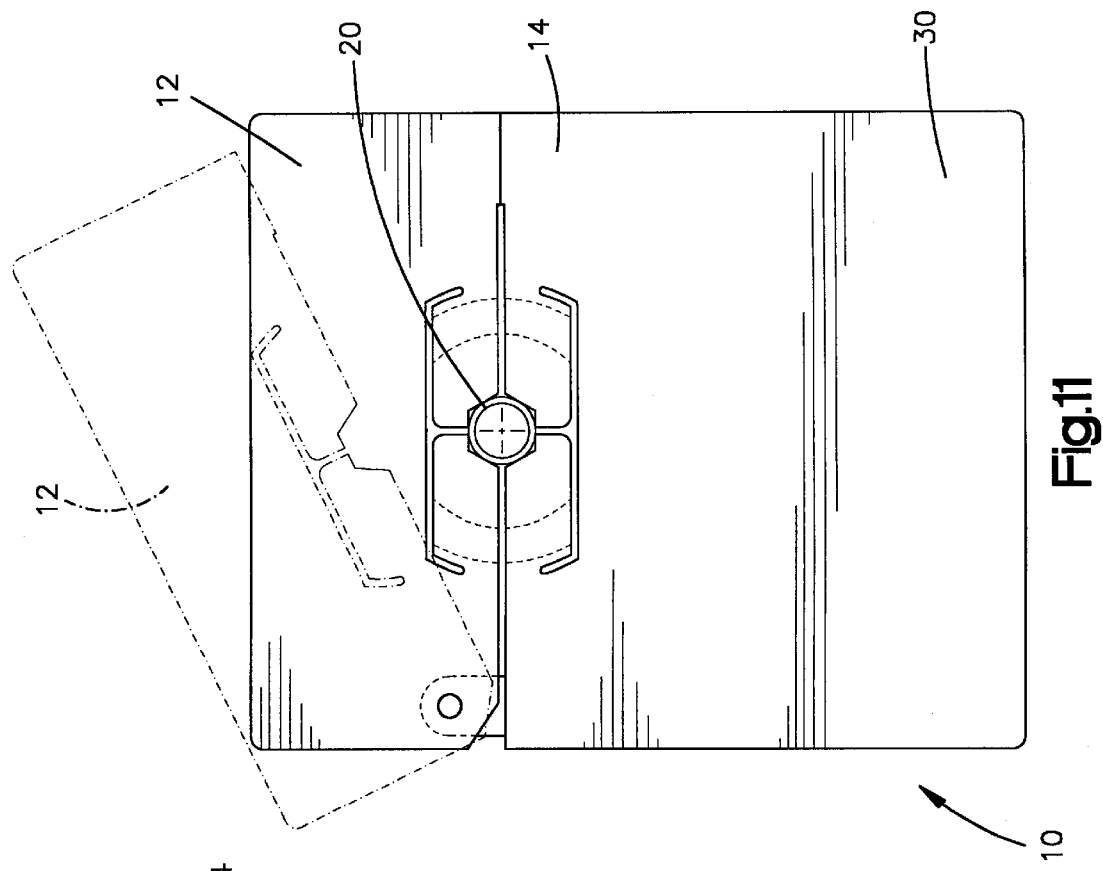
FIG. 11 is a front view of an alternate embodiment of the tube clamping assembly of the present invention.

The clamping areas 36 may be formed in a collet, and the clamp arms may be adapted to receive different collets therein. The collets may be interchanged with collets having clamp areas of differing shapes or sizes. In this maimer, the clamping areas of the present invention may be adapted to receive tubes of differing sizes, or may be changed to adapt to differing welding conditions. It should be understood that the clamping areas and collets described above may be used in any type of assembly used to clamp cylindrical workpieces. For example, an assembly for gripping tubes wherein the clamp arms are generally parallel to the base 30, as opposed to perpendicular to the base, may utilize the clamping areas of the present invention (FIG. 11). In this embodiment, the movable clamp arm 12 may be mounted to the stationary clamp arm 14.

As best shown in FIGS. 1–3, the tube clamping assembly 10 also includes a set of arc shields 80, 82 at the distal ends of the clamp arms. The arc shields aid in shielding the welding arc from the operator's eyes. However, the arc shields may also act as locking means for limiting the relative axial movement of the clamp arms in both the axially inward and axially outward directions. Movement in the axially inward direction is defined herein as axial movement of the clamp arms toward the weld joint or abutting point 24 of the tubes, and movement in the axially outward direction is defined as axial movement away from the weld joint 24.

The second movable clamp arm 16 has a bracket 84 located on its distal end. The bracket 84 extends axially inwardly, bridging the gap between the second movable clamp arm and the first movable clamp arm. The bracket 84 has a downwardly-extending flange portion 86 shaped to closely receive the first movable clamp arm 12 on its axially outward side. In this manner, the bracket 84 couples the movable clamp arms together, and thereby impedes any axially outward movement of the movable clamp arms relative one another. The first movable clamp arm has a cut-away portion 87 to receive the flange portion 86, the cut-away portion 87 being located on the axially outward side of the first movable clamp arm 12. In this manner, the flange 86 is enabled to slide within the cut-away portion 87 during closure or opening of either movable clamp arm.

The first stationary clamp arm 14 has a spacer plate 88 located on its distal end. The spacer plate 88 extends axially inwardly, bridging the gap between the first stationary clamp arm 14 and the second stationary clamp arm 18. The plate 88 has a cut-out 90 formed therein which is shaped to receive a notch 9)2 on the second stationary clamp arm 18. In this manner, the plate 88 acts as a spacer, and ensures that the stationary clamp arms remain spaced apart a predetermined distance. The spacer plate 88 thus blocks any axially inward movement of the stationary arms.

Thus, it is seen that when the coupling assembly is in the gripping position, the movable clamp arms are coupled together by the bracket 84 so as to block the clamp arms 12, 16 from flaring outwardly, and the spacer plate 88 blocks the stationary clamp arms from shifting axially inwardly. As seen in FIGS. 1 and 3, the stationary clamp arm and the movable clamp arm in each arm pair are overlappingly arranged. The movable clamp arms 12, 16 are located axially outwardly of the respective stationary clamp arms 14, 18. Through this overlapping/interlocking arrangement, axial movement of all clamp arms is blocked in both axial directions. The movable clamp arms are located axially outwardly of the stationary clamp arms, and thereby block the stationary clamp arms from flaring outwardly. The stationary clamp arms are located axially inwardly of the movable clamp arms, and via the spacer plate 88 block the movable clamp arms from shifting axially inwardly. The arms may be arranged as overlapping as much as desired so as to ensure that the arms do not slip out of position relative one another.

It should be understood that the arrangement of interlocking arc shields 80, 82 as discussed above may be reversed. That is, the location of the spacer 88 may be on the second stationary clamp arm, and the bracket 84 may be located on the first movable clamp arm. Furthermore, the spacer may be located on one of the movable clamp arms, and the bracket may be mounted on one of the stationary clamp arms. In yet another embodiment, the stationary clamp arms are also coupled by a bracket and flange to prevent axially outward movement. In this embodiment, each movable clamp arm is coupled to the respective stationary clamp arm by a tongue-and-groove arrangement. The tongue-and-groove arrangement aids in limiting the axial movement of the clamp arms in both axial directions. The preferred form of the present invention has been described above. However, with the present disclosure in mind it is believed that obvious alterations to the preferred embodiments, to achieve comparable features and advantages, will become apparent to those of ordinary skill in the art.

What is claimed is:

1. A tube clamping assembly comprising:
   a first portion having a first base and a first clamping device carried on said base; and
   a second portion having a second base and a second clamping device carried on said second base, said first and said second portion being adjustably coupled to each other such that an end of a first cylindrical workpiece gripped by the clamping device of the first portion and an end of a second cylindrical workpiece gripped by the clamping device of the second portion are generally aligned end to end along a longitudinal axis; said first and second bases being self-aligning by independent linear movement in at least two transverse radial directions relative to said longitudinal axis.

2. The tube clamping assembly of claim 1 wherein said first portion and said second portion are joined at their respective bases.

3. The tube clamping assembly of claim 1 wherein said clamping devices are releasable.

4. The tube clamping assembly of claim 1 wherein said first portion and said second portion are coupled by a fastener passed through said first portion and threadedly received in said second portion.

5. The tube clamping assembly of claim 1 wherein said first portion and said second portion are adjustable in at least two directions relative each other.

6. The tube clamping assembly of claim 1 wherein each clamping device includes a pair of clamp arms each having a clamping surface, and wherein at least one of said clamp arms in each clamping device is movable from a gripping position wherein said clamping surfaces may grip a cylindrical workpiece therebetween, to a release position wherein said cylindrical workpiece is not gripped by said clamping surfaces.

7. The tube clamping device of claim 6 wherein each clamping device includes a stationary clamp arm and a movable clamp arm.

8. The tube clamping assembly of claim 7 wherein each movable clamp arm is pivotably attached to its respective base.

9. The tube clamping assembly of claim 7 wherein each movable clamp arm is pivotably attached to its respective stationary clamp arm.

10. The tube clamping assembly of claim 7 wherein each stationary clamp arm is removably coupled to its respective base.

11. The tube clamping assembly of claim 7 wherein each stationary clamp arm is rigidly attached to its respective base.

12. The tube clamping assembly of claim 1 wherein said first portion and said second portion are shaped so as to closely engage each other.

13. The tube clamping assembly of claim 12 wherein one of said portions has a notch, and the other of said portions has a groove shaped to receive said notch.

14. The tube clamping assembly of claim 1 wherein said assembly is shaped to receive an orbital weld head therein for welding a pair of cylindrical workpieces held in said clamping devices.

15. The tube clamping assembly of claim 14 further comprising an orbital weld head located to weld said pair of cylindrical workpieces.

16. The tube clamping assembly of claim 1 wherein said base of said first portion and said base of said second portion each have a cut-out and wherein said cut-outs are aligned so as to closely receive a weld head therein.

17. A tube clamping assembly comprising:
   a first portion having a first clamping device shaped to receive a first cylindrical workpiece therein; and
   a second portion having a second clamping device shaped to receive a second cylindrical workpiece therein, said workpieces being clamped in an end to end facing relationship along a common longitudinal axis at a common radial plane relative to said longitudinal axis when mounted in said clamping devices; said first and said second portions being adjustably coupled to each other such that said first and second cylindrical workpieces may be radially and axially aligned with each other; said first and second portions being self-aligning by independent linear movement in at least two transverse radial directions of said common plane to produce a coaxial alignment of said workpieces.

18. The assembly of claim 1 wherein said first and second bases self-align in said transverse radial directions to produce a coaxial alignment of the workpieces.

19. The assembly of claim 1 wherein said first and second bases self-align in said transverse radial directions to produce a coaxial alignment of said clamping devices when a single workpiece is clamped by both said clamping devices at the same time.

* * * * *